(12) United States Patent
Park (10) Patent No.: US 8,443,503 B2
(45) Date of Patent: May 21, 2013

(54) AUTOMATED TOE ADJUSTMENT APPARATUS USING FLOATING MECHANISM

(75) Inventor: Ji Hoon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 177 days.

(21) Appl. No.: 13/075,777

(22) Filed: Mar. 30, 2011

(65) Prior Publication Data

US 2012/0137522 A1 Jun. 7, 2012

(30) Foreign Application Priority Data

Dec. 1, 2010 (KR) ........................ 10-2010-0121091

(51) Int. Cl.
*B23Q 17/00* (2006.01)

(52) U.S. Cl.
USPC ............... 29/407.02; 29/407.04; 81/57.14

(58) Field of Classification Search
USPC ... 29/407.02, 407.04; 901/30, 41, 44; 81/57.4
See application file for complete search history.

(56) References Cited

U.S. PATENT DOCUMENTS

| 4,679,327 | A | * | 7/1987 | Fouchey et al. | 33/203.13 |
| 5,027,275 | A | * | 6/1991 | Sakamoto et al. | 701/36 |
| 5,040,303 | A | * | 8/1991 | Koerner | 33/286 |
| 6,163,946 | A | * | 12/2000 | Pryor | 29/407.04 |
| 6,314,631 | B1 | * | 11/2001 | Pryor | 29/407.04 |
| 6,386,564 | B1 | * | 5/2002 | Kincad et al. | 280/93.51 |
| 7,357,053 | B2 | * | 4/2008 | Doan | 81/57.14 |
| 8,082,822 | B2 | * | 12/2011 | Hoenke | 81/57.14 |
| 2003/0070193 | A1 | * | 4/2003 | Pfeiffer | 901/30 |
| 2006/0108131 | A1 | * | 5/2006 | Osada et al. | 173/11 |

FOREIGN PATENT DOCUMENTS

| JP | 01-145212 A | 6/1989 |
| JP | 04087886 A | 3/1992 |
| JP | 2007326171 A | 12/2007 |
| JP | 2009255829 A | 11/2009 |
| JP | 2010149862 A | 7/2010 |
| KR | 10-2002-0095407 A | 12/2002 |
| KR | 10-2005-0032344 A | 4/2005 |
| KR | 10-2008-0093260 | 10/2008 |

* cited by examiner

*Primary Examiner* — David Bryant
*Assistant Examiner* — Justin Sikorski
(74) *Attorney, Agent, or Firm* — Edwards Wildman Palmer LLP; Peter F. Corless (57) ABSTRACT

The present invention provides an automated toe adjustment apparatus and method that includes a power nut runner, a vision machine, a robot, and a floating mechanism. More particularly, the power nut runner adjusts a toe by adjusting an adjusting bolt of the tie-rod assembly. The vision machine photographs the power nut runner to verify position information of the power nut runner. The robot engages the power nut runner with the adjusting bolt of the tie-rod assembly and rotates the power nut runner. The floating mechanism absorbs a shock between the power nut runner and the robot as the vehicle is shaken by the overall process.

9 Claims, 11 Drawing Sheets

AUTOMATED TOE ADJUSTMENT APPARATUS USING FLOATING MECHANISM

CROSS-REFERENCE TO RELATED APPLICATION

This application claims under 35 U.S.C. §119(a) the benefit of Korean Patent Application No. 10-2010-0121091 filed Dec. 1, 2010 the entire contents of which are incorporated herein by reference.

BACKGROUND (a) Technical Field

The present disclosure relates to an automated toe adjustment apparatus using a floating mechanism. More particularly, it relates to an automated toe adjustment apparatus using a floating mechanism that absorbs a shock between a power nut runner and a robot.

(b) Background Art

Generally, there is a wheel alignment process in a vehicle inspection line, in which a worker aligns a tire through toe, camber, and caster adjustments using a spanner and a torque wrench.

Figure 1:
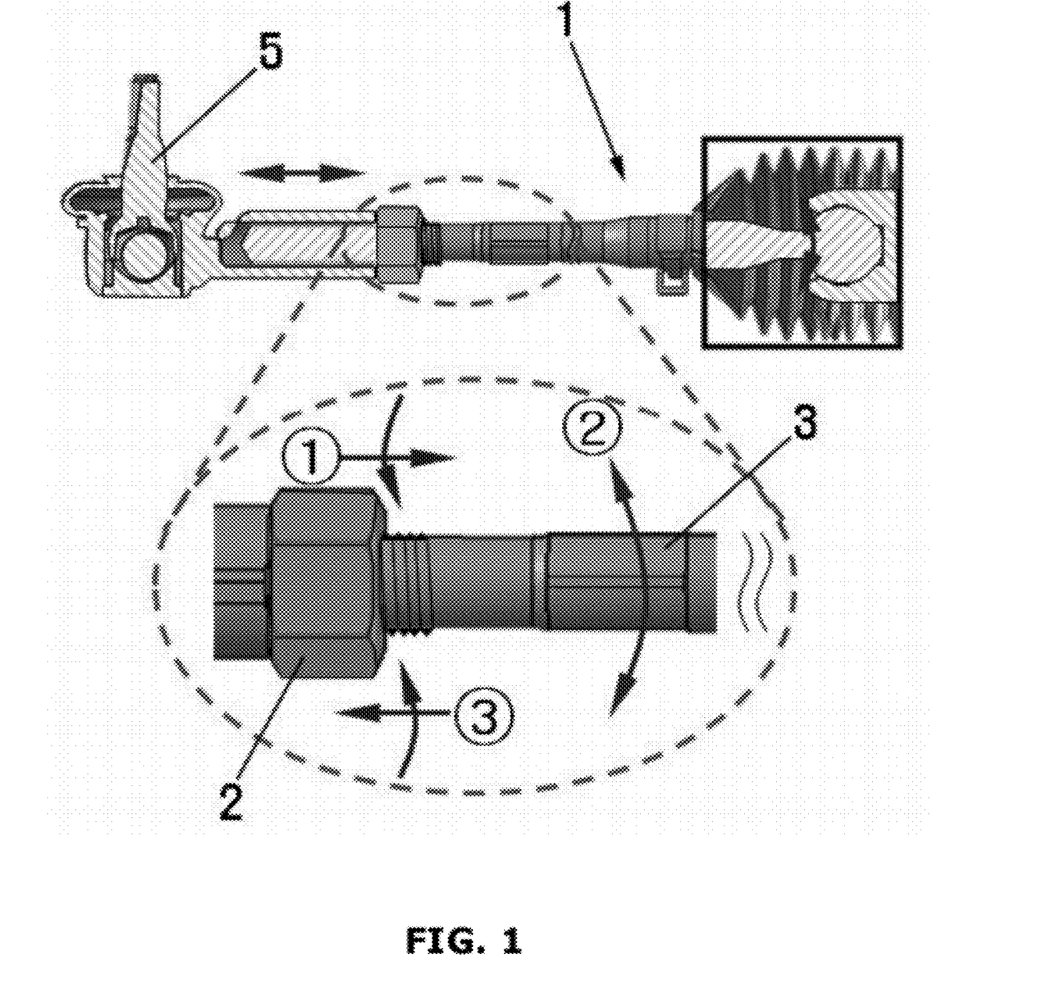
FIG. 1 is a schematic view illustrating a conventional toe adjustment.

As illustrated in FIG. 1, in a toe adjustment method of the wheel alignment process, a stop nut 2 of a tie-rod assembly 1 is turned and loosened, and then an adjusting bolt 3 is turned to adjust a toe of a wheel. After the toe adjustment is completed, the stop nut 2 is turned to be fastened, thereby maintaining the state where the toe is adjusted. Unexplained reference numeral 5 indicates a tie-rod end.

Figure 2:
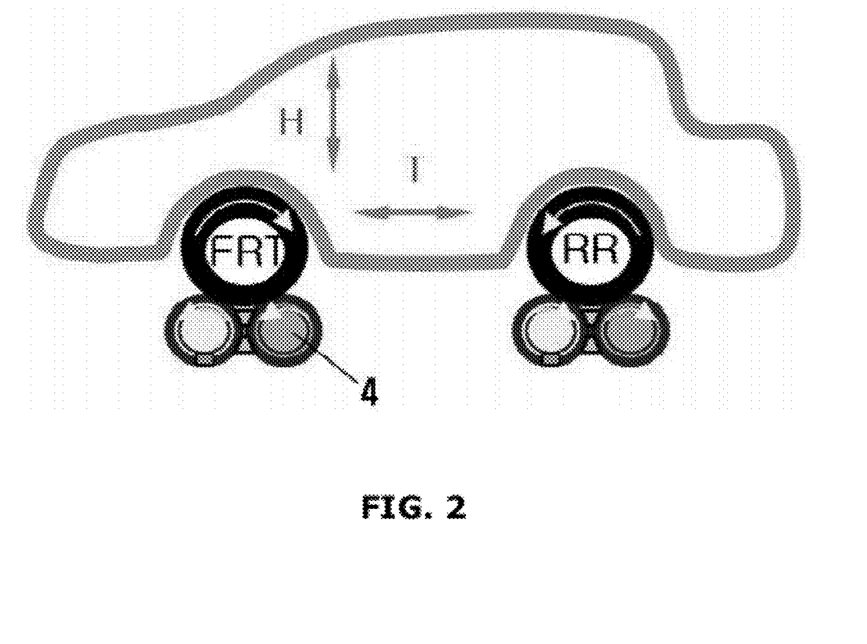
FIG. 2 is a schematic view illustrating shaking of a vehicle in a wheel alignment process.

As shown in FIG. 2, in the wheel alignment process, a tire is forcibly rotated by a dynamo 4. In this case, a vehicle is not shaken in the direction of the body width L because the vehicle is fixed by a centering device, while the vehicle is shaken in the directions of the body length T and the body height H.

Figure 3:
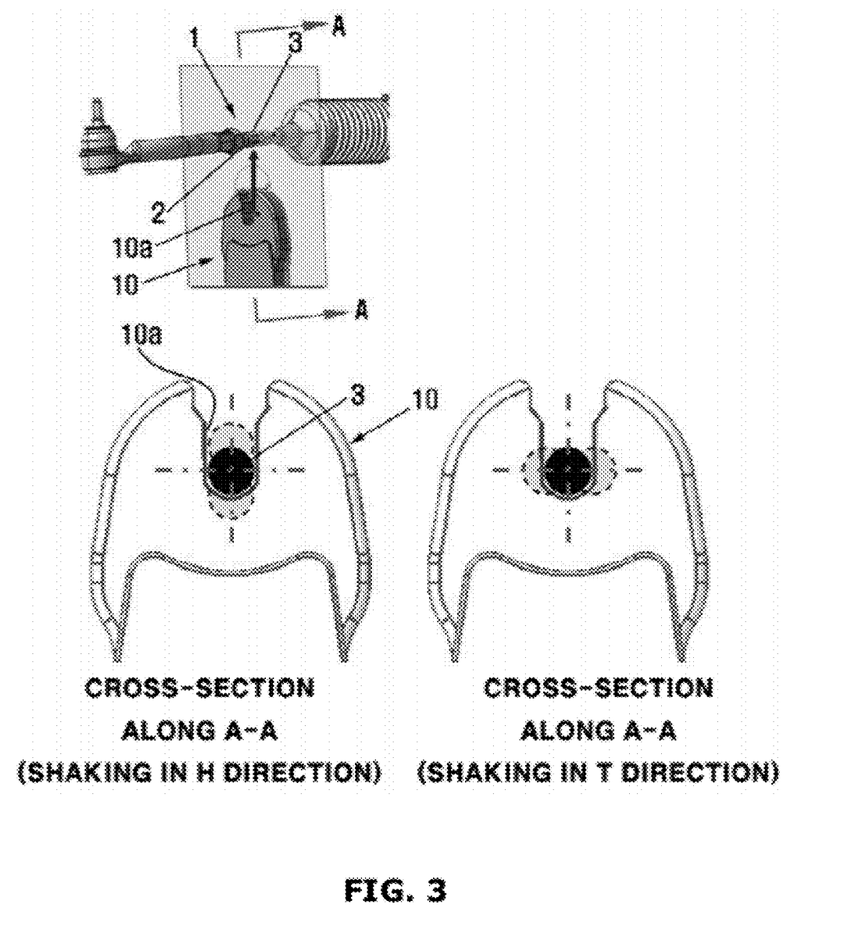
FIG. 3 is a view illustrating an operating state for explaining a limitation in the conventional toe adjustment.

Here, when the toe adjustment is manually performed, a worker may verify the position of the tie-rod with the naked eye, and may flexibly deal with shaking of a vehicle by moving a spanner and a torque wrench according to the shaking of the vehicle. However, when the toe adjustment is automated using vision machine, a robot, and a power nut runner, there is a limitation in that when the position of a stop nut and an adjusting bolt of a tie-rod assembly is verified through the vision machine, and then, as described in FIG. 3, the robot tries to engage a toe adjustment unit 10a of the power nut runner 10 with the central shaft of the tie-rod assembly 1 it is difficult to engage the power nut runner 10 with the stop nut 2 and the adjusting bolt 3. This is because the central shaft of the power nut runner 10 and the central shaft of the tie-rod assembly 1 are not aligned with each other due to the shaking of the vehicle in the H and T directions, Also, even when the power nut runner 10 engages with the stop nut 2 and the adjusting bolt 3, the shaking of the vehicle may be transferred to the power nut runner 10 and the robot thereby giving a shock to a gear and a motor of the power nut runner 10, and a drive of the robot. Accordingly, a malfunction may occur in the power nut runner 10 and the robot, causing reduction of the lifespan of the automated toe adjustment apparatus.

Furthermore, the above information disclosed in this Background section is only for enhancement of understanding of the background of the invention and therefore it may contain information that does not form the prior art that is already known in this country to a person of ordinary skill in the art.

SUMMARY OF THE DISCLOSURE

One aspect of the present invention provides an automated toe adjustment apparatus, including: a power nut runner configured to adjust a toe by adjusting an adjusting bolt of the tie-rod assembly. The present invention also includes a vision machine system for photographing the power nut runner. The vision machine system is utilized by the present invention to verify position information of the power nut runner. Additionally, a robot engages the power nut runner with the adjusting bolt of the tie-rod assembly and rotates the power nut runner. A floating mechanism is also utilized to absorb shock between the power nut runner and the robot.

In a preferred embodiment of the present invention, the floating mechanism may also include: a body frame on which the power nut runner is mounted; a vertical floating unit moving the power nut runner by a linear motion guide (LM-guide); and a rotational floating unit for rotating the power nut runner about a shaft by a bearing, and may flexibly deal with shaking of a vehicle by a combination of the vertical floating unit and the rotational floating unit.

In another preferred embodiment, the vertical floating unit may include: a vertical sliding block coupled to a rear surface of the body frame; and a rotational frame on which the LM-guide is mounted to be vertically movable along the LM-guide.

In still another preferred embodiment, the vertical floating unit may include a plurality of vertical control plungers at an upper portion and a lower portion of a vertical sliding block to control a vertical movement of the vertical sliding block.

In yet another preferred embodiment, the rotational floating unit may be connected to a middle portion of the power nut runner, and may include: a shaft rotating the power nut runner; and a fixing block allowing the shaft to be rotatably mounted by a bearing at a central portion thereof. The fixing block also allowing the vision machine and the robot to be coupled to a top surface and a rear surface thereof, respectively.

In still yet another preferred embodiment, the rotational floating unit may include a rotational block rotating at the same angle as the power nut runner, and a rotation controlling plunger for controlling a rotation of the power nut runner 10 by a contact and an interference with the rotational block.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Reference numerals set forth in the Drawings include reference to the following elements as further discussed below:

| | |
|---|---|
| 1: tie-rod assembly | 3: adjusting bolt |
| 10: power nut runner | 10a: toe adjustment unit |
| 11: robot | 12: vision machine |
| 13: vision housing | 14: camera |
| 20: floating mechanism | 21: body frame |
| 22: nut runner connection | 23: connection member |
| 24: nut runner support part | 25: floating part |
| 26: vertical floating part | 27: rotational floating part |
| 28: vertical sliding block | 29: LM-bearing |
| 30: LM-guide | 31: rotational frame |
| 32: vertical control plunger | 33: fixing hole |
| 34: rotational flange connection recessed portion | 35: shaft |
| 36: rotational flange | 37: rotational block |
| 38: fixing block | 39: rotation controlling plunger |
| 40: bearing | 41: bearing spacer |
| 42: lock nut | 43: shaft fixing part |
| 44: vision connection | 45: robot mounting part |

It should be understood that the appended drawings are not necessarily to scale, presenting a somewhat simplified representation of various preferred features illustrative of the basic principles of the invention. The specific design features of the embodiments of present invention as disclosed herein, including, for example, specific dimensions, orientations, locations, and shapes will be determined in part by the particular intended application and use environment and therefore are exemplary only.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to an apparatus and a method for absorbing shock in an automated toe adjustment assembly. In particularly, in the present invention a toe is adjusted by adjusting a bolt associated with a tie-rod assembly. As the nut runner is approaching the bolt a vision machine photographs the nut runner to verify position information of the nut runner and communicates with a computer to determine that the nut runner is in the correct position based on the photographs taken by the vision machine. Then in response to determining the nut runner is in the correct position, a robot engages the nut runner with the bolt of the tie-rod assembly and rotates the nut runner. The vibrations created from the process are absorbed by a floating mechanism so that the shock is not delivered to the nut runner and the robot.

Hereinafter, preferred embodiments of the present invention will be described in detail with reference to the accompanying drawings.

Figure 4:
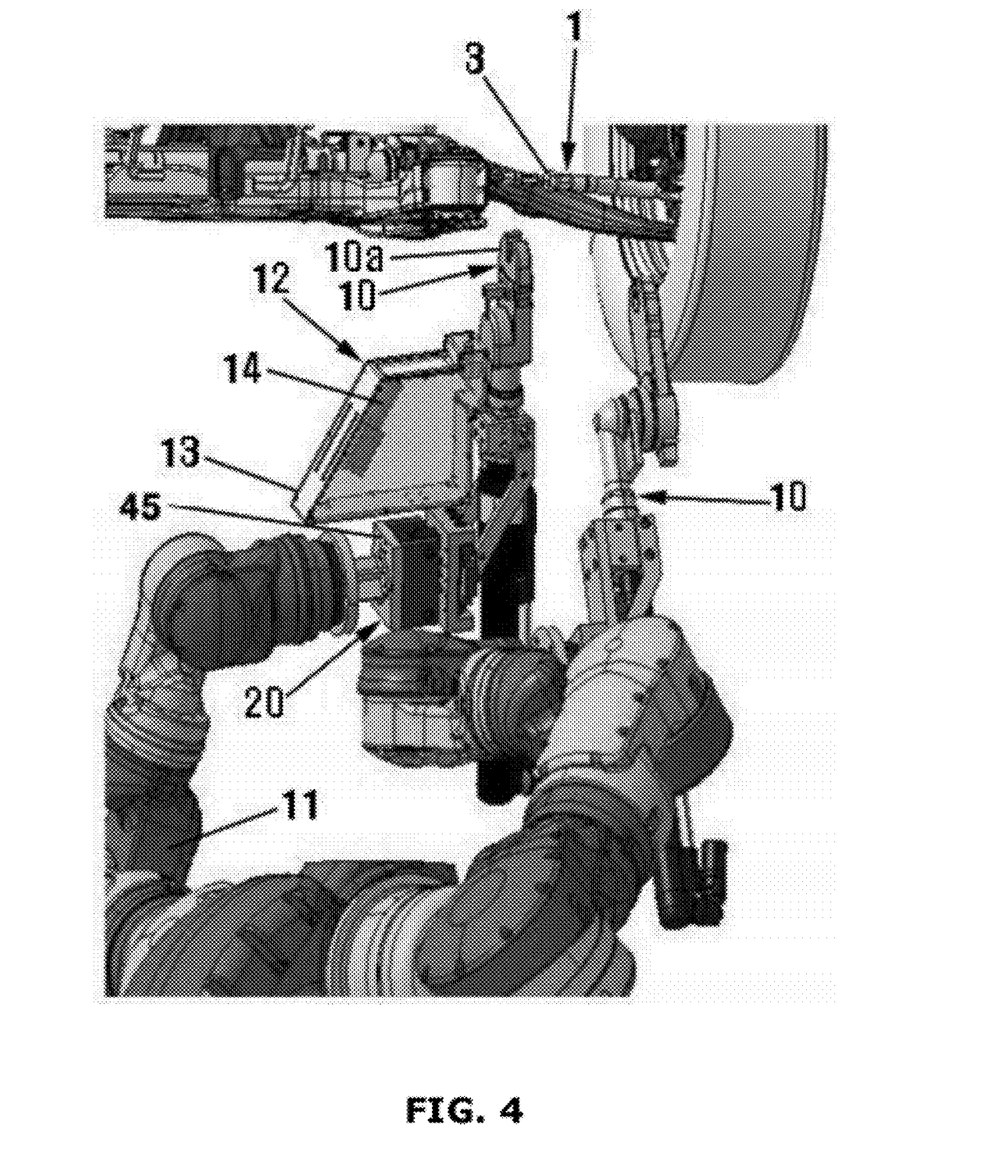
FIG. 4 is a perspective view illustrating an exemplary toe adjustment operation using an automated toe adjustment apparatus according to an illustrative embodiment of the present invention.
Figure 5:
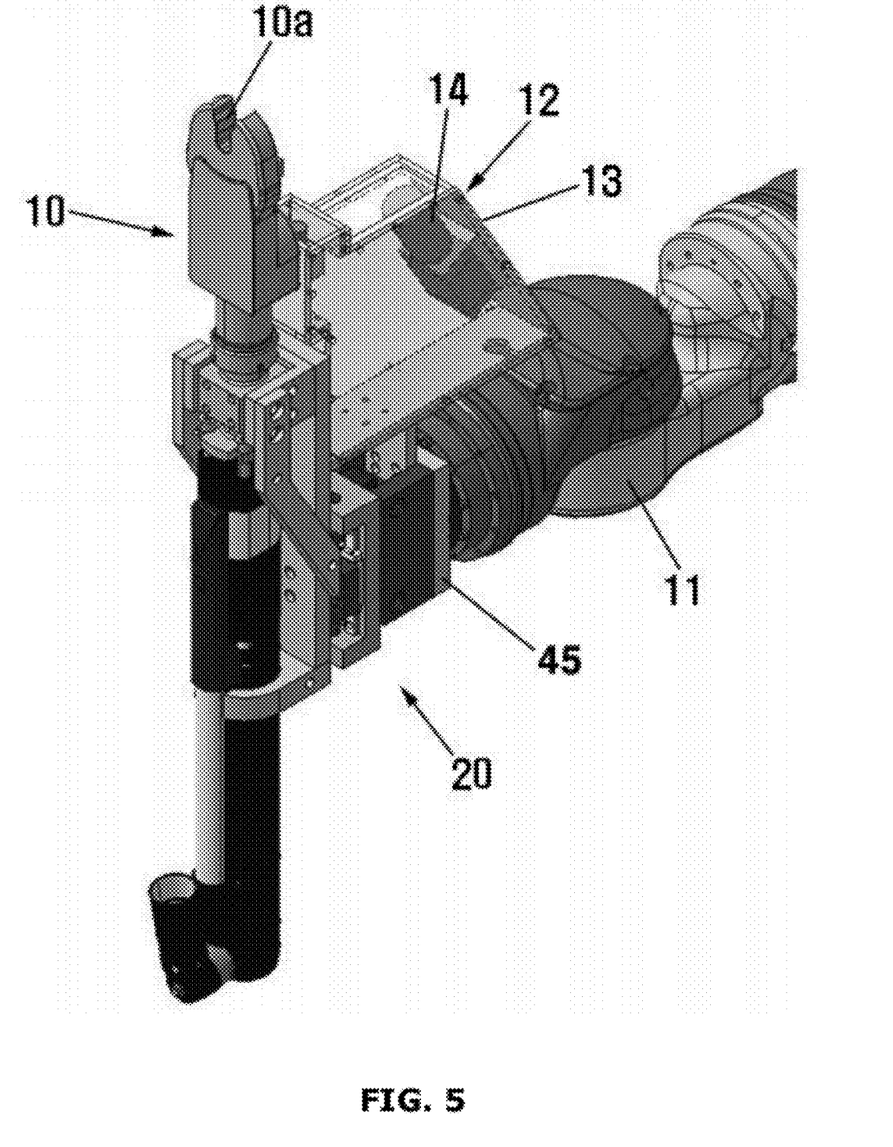
FIG. 5 is a perspective view illustrating the exemplary automated toe adjustment apparatus of FIG. 4 using a floating mechanism.

The present disclosure relates to an automated toe adjustment apparatus utilizing a floating mechanism 20 between a power nut runner 10 and a robot 11, which may absorb a shock therebetween.

Figure 6:
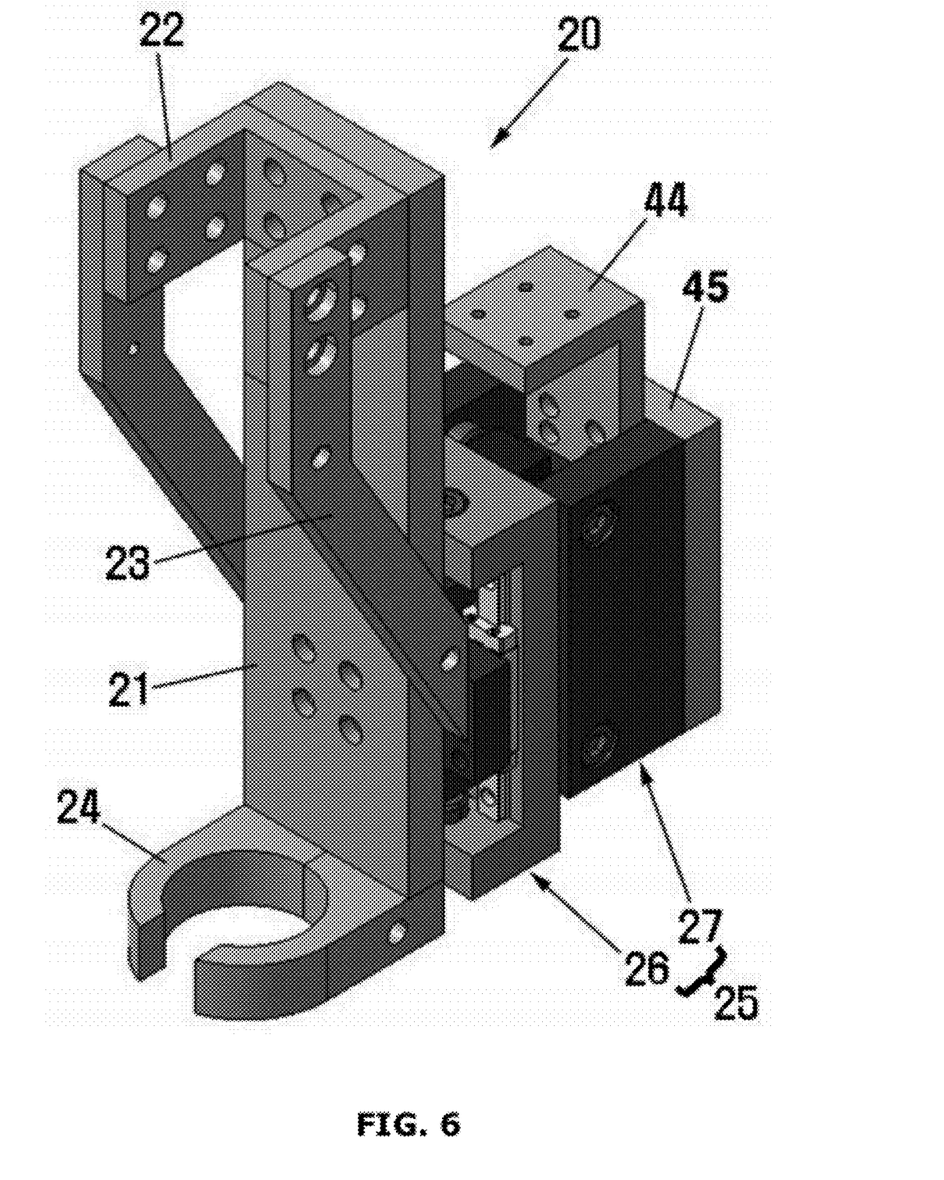
FIG. 6 is a perspective view illustrating the exemplary floating mechanism of FIG. 5.

The floating mechanism 20 may include a nut runner connection 22 on which the power nut runner 10 is mounted, a vision connection 44 on which a vision machine 12 may be mounted, a robot mounting part 45 on which the robot 11 may be mounted, and a floating part 25 for absorbing a shock from a shaking of a vehicle The floating mechanism 20 may have a body frame 21 of a plate structure having a rectangular shape to couple the power nut runner 10 to the floating part 25.

The power nut runner 10 may be vertically coupled to the front side of the body frame 21.

In the exemplary embodiment of the present invention, the nut runner connection 22 may be formed of a U-shaped plate. The rear surface of the nut runner connection 22 may be coupled to the front surface of the upper portion of the body frame 21 by a coupling means, and the both side surfaces of the nut runner connection 22 may be connected to the middle of each of the side surfaces of the body frame 21 by a connection member 23.

In this case, the connection member 23 may include a vertical connection member coupled to one of the side surfaces of the nut runner connection 22, and an oblique member obliquely extending from the vertical connection member to the body frame 21 and coupled to the middle of the both side surfaces of the body frame 21.

The body frame 21 may include a nut runner support part 24 at the lower end thereof, and may support the power nut runner 10 by surrounding it using the nut runner support part 24. Also, the floating part 25 may be coupled to the rear surface of the lower end of the body frame 21 by a coupling means such as a screw.

Figure 7:
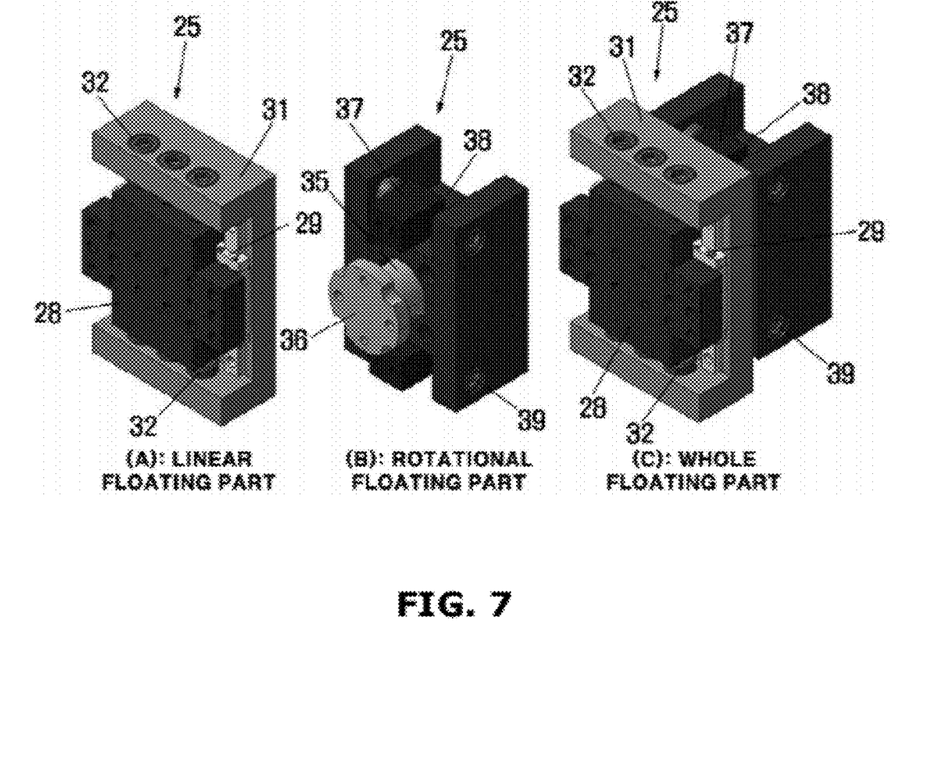
FIG. 7 is a perspective view illustrating an exemplary vertical floating unit and an exemplary rotation floating unit of FIG. 6.

More specifically, the floating part 25 is configured absorb the shaking of a vehicle to prevent the shaking from being delivered to the power nut runner 10, the vision machine 12, and the robot 11, and may include a vertical floating part 26 coupled to the rear surface of the body frame 21 and floating in a vertical direction (H direction), and a rotational floating part 27 coupled to the vertical floating part 26 and rotating in a circumferential direction (T direction) to flexibly deal with the shaking of the T and H directions of the vehicle.

Figure 8:
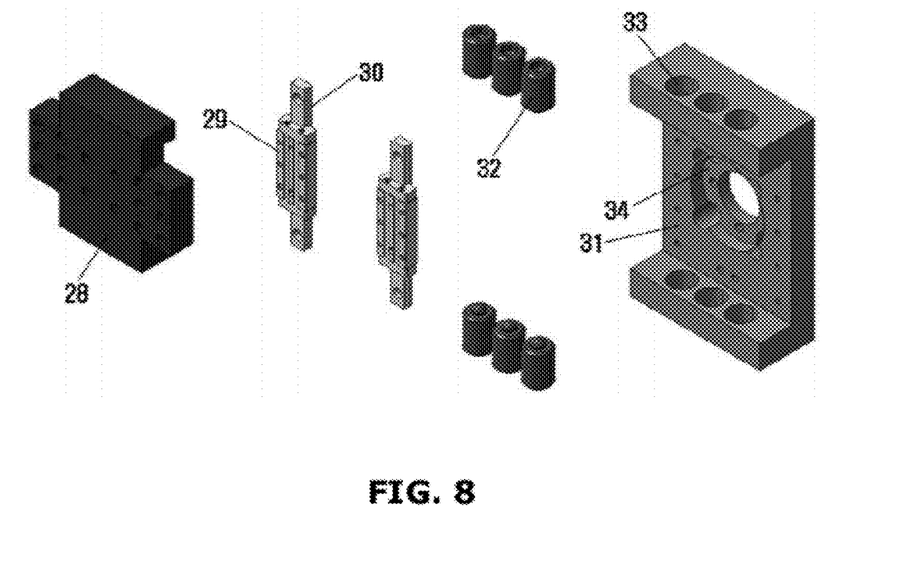
FIG. 8 is an exploded view of the vertical floating unit of FIG. 7.

The vertical floating part 26 may also include a vertical sliding block 28 connected to the rear surface of the body frame 21, a rotational frame 31, the front surface on which an LM-guide 30 is vertically installed, and a vertical control plunger 32 configured to control the vertical movement of the vertical sliding block 28.

Additionally as can be seen from the illustrative embodiment of the present invention the vertical sliding block 28 may have a cross-shaped plate structure having flange parts protruding from the upper end and lower end thereof. The flange part may contact the vertical control plunger 32 to thereby control the vertical movement of the vertical sliding block 28.

Also, guide connections may protrude from the both side surfaces of the cross-shaped plate, and a linear motion bearing (LM-bearing) 29 is coupled to the guide connection to allow the vertical sliding block 28 to be connected to the LM guide 30 by means of the LM bearing 29 and vertically slide on the rotational frame 31.

The rotational frame 31 may have a rectangular plate structure, and may have the LM-guide 30 vertically fixed on the front surface of the plate. In particularly, the LM-bearing 29, installed on the rear surface of the vertical sliding block 28, may vertically move along the LM-guide 30, thereby vertically floating the body frame 21 and the power nut runner 10 connected to the vertical sliding block 28 by the LM-guide 30.

In some embodiments of the present invention, the plunger fixing parts may be protrusively formed on the top end and lower end of the rotational frame 31. A plurality of fixing holes 33 may then be formed in each plunger fixing part side by side, and the plurality of vertical control plungers 32 may be inserted into the fixing holes 33.

Shock-absorbing protrusions of a hemispherical shape may be formed at one end of the plunger. When the plunger is fixedly inserted into the fixing hole 33, the shock-absorbing protrusions of an upper plunger and a lower plunger may face each other.

By doing so, the plunger may control the vertical movement of the vertical sliding block 28, by stopping the vertical sliding block 28 utilizing the contact of the shock-absorbing protrusions of each plunger upon rise and fall of the flange part of the vertical sliding block 28.

A shaft through-hole of a circular shape may be formed on the center of the rotational frame 31, and a rotational flange connection recessed portion 34 of a circular shape around the shaft through-hole. A rotational flange 36 may be inserted into the rotational flange connection recessed portion 34 and coupled by a coupling means to allow the rotation frame 31 to rotate about a shaft 35.

Figure 9:
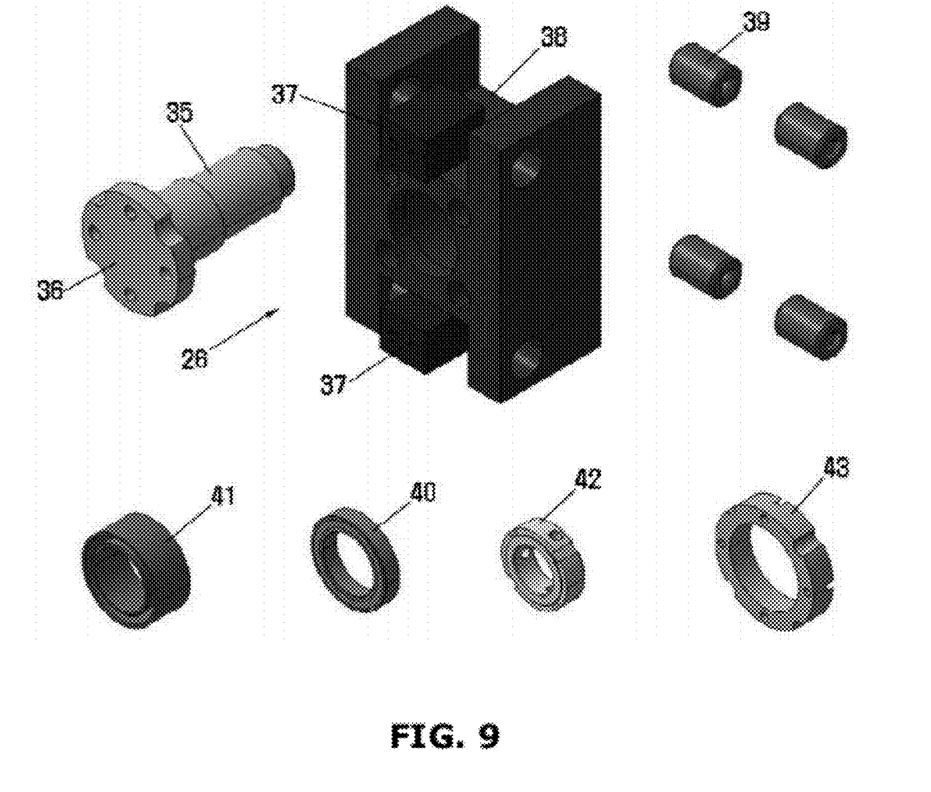
FIG. 9 is an exploded view of the rotation floating unit of FIG. 7.

The rotational floating part 27 may be connected to the rotational frame 31, and may include a shaft 35 for rotating the power nut runner 10, a fixed block 38 in which the shaft 35 is mounted, and rotatably supported by a bearing 40, a rotational block 37 controlling the rotation of the rotational frame 31, and a rotation controlling plunger 39.

The shaft 35 may include a rotational flange 36 inserted into the rotational flange connection recessed portion 34, a shaft body having a smaller diameter and formed from the rear surface of the rotational flange 36 in an axial direction, a bearing mounting part extending from the shaft body in the axial direction and mounted with the bearing 40, and a lock nut mounting part having a smaller diameter extending from the bearing mounting part in the axial direction and mounted with a lock nut 42.

By doing so, the rotational flange 36, the shaft body, the bearing mounting part, and the lock nut mounting part may be integrally formed on the same shaft line.

The fixed block 38 may include a block body having a rectangular shape and a plunger fixing part parallelly protruding from both sides of the upper and lower ends of the block body.

Figure 10:
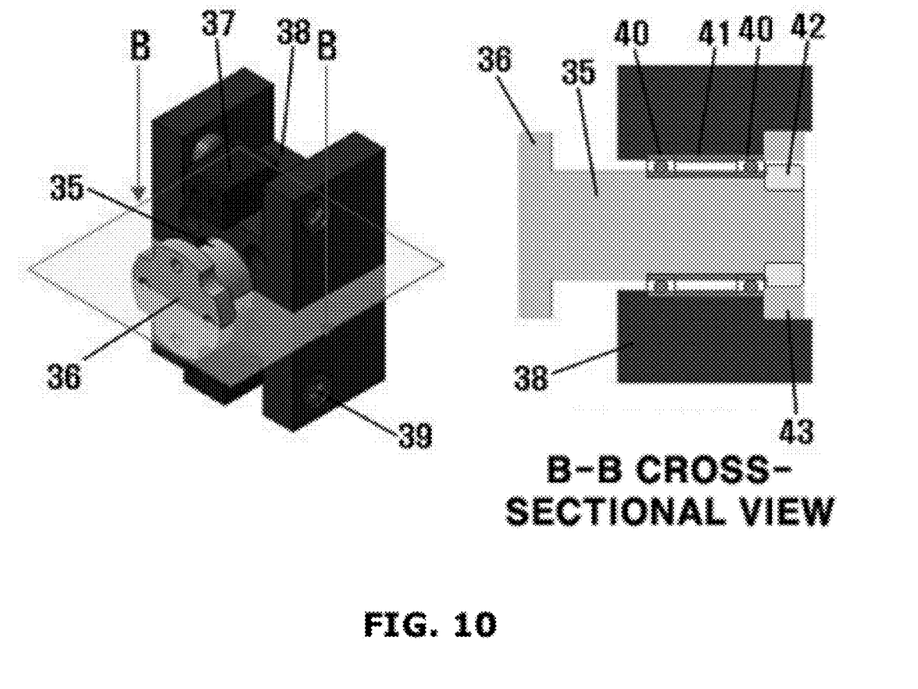
FIG. 10 is a cross-sectional view taken along line B-B of the exemplary rotation floating unit of FIG. 7.

The fixing block 38 may have a shaft fixing hole for receiving the shaft 35, and may include a bearing spacer 41 and a bearing 40 therein. The shaft 35 may be rotatably supported by the bearing 40.

In one embodiment of the present invention, the bearing 40 may be fixed by the bearing spacer 41 in the shaft fixing hole of the fixing block 38 at a certain interval along the axial direction. Accordingly, the bearing mounting part of the shaft 35 may be inserted into the bearing 40 and the bearing spacer 41 in order to allow the shaft 35 to be rotatably supported by the bearing 40.

In some embodiments of the present invention the fixing block 38 may have a shaft fixing recessed portion recessed at one side thereof, which the lock nut 42 and a shaft fixing part 43 may be inserted into and fixed. The shaft fixing recessed portion may also be concentric with the shaft fixing hole, and have a diameter greater than that of the shaft fixing hole. The lock nut 42 and the shaft fixing part 43 may be concentrically inserted into the shaft fixing recessed portion and fixed to prevent the bearing 40 from disengaging from the shaft 35.

In addition, the fixing block 38 may have a plunger fixing hole formed at one side of the plunger fixing part where the rotation controlling plunder 39 may be inserted and fixed in the plunger fixing hole. The rotation of the rotational frame 31 may be controlled by contacting and stopping the rotational block 37 using the rotation controlling plunger 39.

In this case, the rotation block 37 may be fixed at an upper side and a lower side of the rear surface of the rotational frame 31, and may be disposed between the rotation controlling plungers 39 of the fixing block 38 to rotate about the shaft 35. The rotation block 37 may be contacted and interfered between the rotation controlling plunger 39, thereby controlling the rotation of the rotational frame 31 and the power nut runner 10.

The vision machine 12 may include a vision housing 13 and a camera mounted on an inclined surface of the inside of the vision housing 13. The camera 14 may photograph the toe adjustment unit 10a of the power nut runner 10 to send the photograph to a vision control PC, which may find position information of the toe adjustment unit 10a of the power nut runner 10 using pattern matching.

The fixing block 38 may include a vision connection 44 on the top of the block body. The vision machine 12 may be fixed on the top of the fixing block 38 by the vision connection 44 which in some embodiments may have an L shaped plate structure.

A horizontal member on the top of the plate may be coupled to the undersurface of the vision housing 13 of the vision machine 12, and a vertical member of the side surface of the plate may be inserted between the plunger fixing parts of the fixing block 38 to be coupled to the top end of the robot mounting part 45.

The fixing block 38 may include the robot mounting part 45 to fix the end of the robot 11 on the rear surface thereof. The robot mounting part 45 may have coupling holes formed therein at a certain interval along the circumferential direction.

Figure 11:
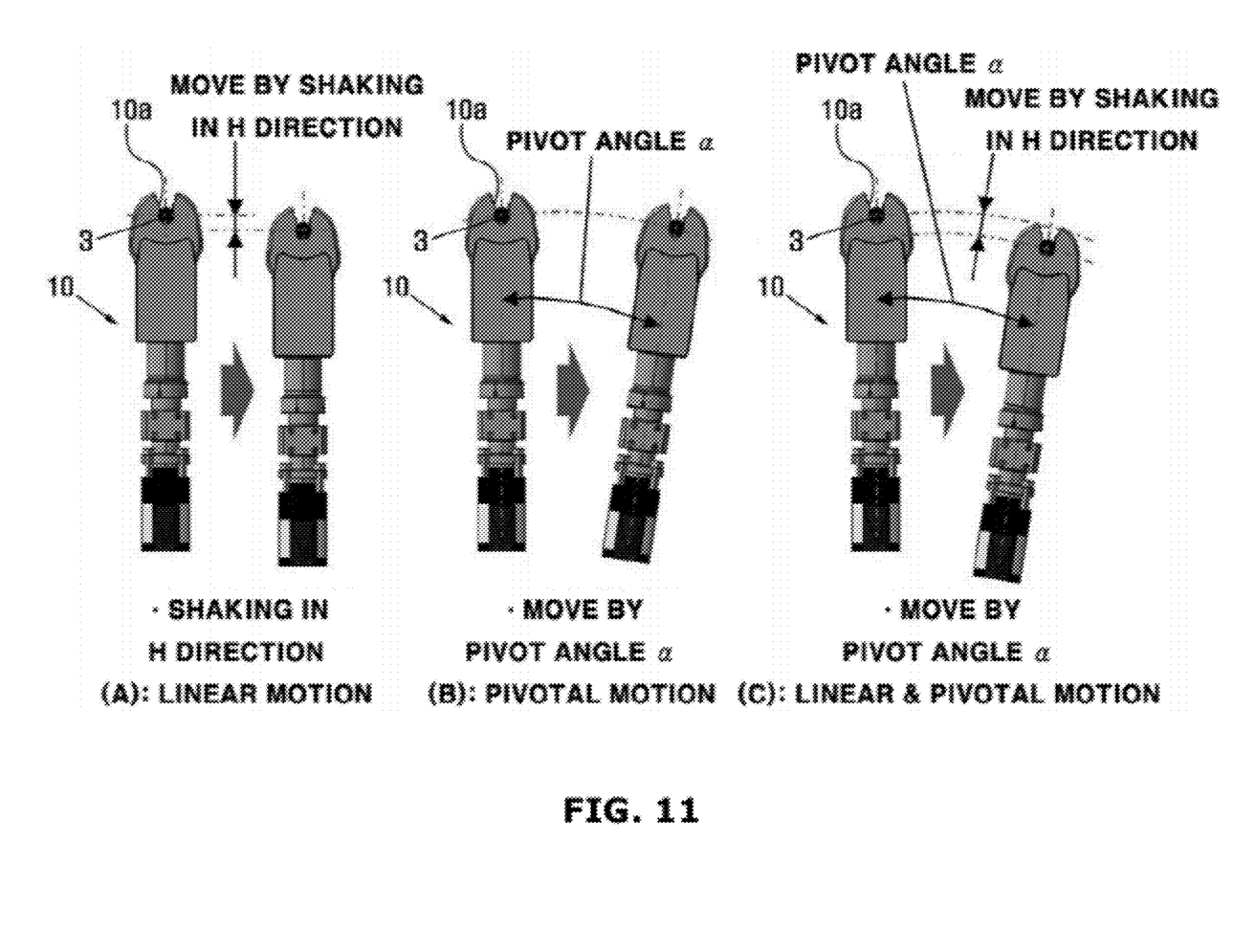
FIG. 11 is a view illustrating an exemplary operation state of an exemplary power nut runner by the exemplary floating mechanism of FIG. 5.

An operation state of the floating mechanism 20 and a toe adjustment method according to an embodiment of the present invention as configured above will be described below.

First, the vision machine 12 and the power nut runner 10 may be coupled to the floating mechanism 20, and then the floating mechanism 20 may be mounted on the end of the robot 11.

In this embodiment of the present invention the vision machine 12 may be fixed on the vision connection 44 over the fixing block 38 of the floating mechanism 20. A nut runner mounting part formed at the lower portion of the toe adjustment unit 10a of the power nut runner 10 then may be coupled to the nut runner connection 22 which is installed at the body frame 21 of the floating mechanism 20. Then a lower portion of the body of the power nut runner 10 may be inserted and supported by the nut runner support part 24.

Additionally, the floating mechanism 20 may be coupled to the end of the robot 11 through the robot mounting part 45 coupled to the rear surface of the fixing block 38.

In order to track positions of various part within the system, a computer, e.g., a process PC, may be utilized which knows the position information of for example the stop nut 2 and the adjusting bolt 3 of the tie-rod assembly 1, which is obtained through u vision machine 12. The toe adjustment may be performed by the robot 11 and the power nut runner 10 using a measured value that is obtained through the computer in real-time.

The robot 11 may engage the toe adjustment unit 10a of the power nut runner 10 with the stop nut 2 of the tie-rod assembly 1, and then may loosen the stop nut 2 by rotating the toe adjustment unit 10a.

Thereafter, the robot 11 may engage the toe adjustment unit 10a of the power nut runner 10 with the adjusting bolt 3 of the tie-roe assembly 1, and then adjust the adjusting bolt 3 by rotating the toe adjustment unit 10a. When the process PC verifies toe as OK, a signal may be sent to a robot control unit to allow the toe adjustment unit 10a to engage with the stop nut 2 and fasten the stop nut 2.

Here, the automated toe adjustment apparatus according to an embodiment of the present invention may flexibly deal with the shaking of the vehicle in the H and T directions.

If the robot 11 verifies the position information of the stop bolt 2 and the adjusting bolt 3 of the tie-rod assembly 1 obtained from the vision machine 12, and the toe adjustment unit 10a of the power nut runner 10 approaches and engages with the stop nut 2 and the adjusting bolt 3, the power nut runner 10 may move in the directions of the body height and body length due to the shaking of the vehicle in the H and T directions.

In this case, the shaking of the vehicle transferred through the power nut runner 10 may be delivered to the nut runner connection 22 connected to the power nut runner 10, the body frame 21 coupled to the nut runner connection 22, and the vertical sliding block 28 coupled to the real surface of the body frame 21.

When the vertical sliding block 28 moves in the height and length directions of the vehicle, the LM-guide 30 installed at the rotational frame 31 may allow the vertical sliding block 28 coupled by means of the LM-bearing 29 to slide in the vertical direction. Accordingly, the vertical movement of the power nut runner 10 caused by shaking the vehicle in the H-direction would not be delivered to the vision machine 12 and the robot 11, thus protecting them from any shock.

The shaking of the vehicle in the H-direction, delivered through the vertical sliding block 28, may be absorbed by the LM-guide 30, while the shaking of the vehicle in the T-direction, delivered through the vertical sliding block 28, may be delivered to the LM-bearing 29 fixed on the rear surface of the vertical sliding block 28, the LM-guide 30 vertically slidable to the LM-bearing 29, and the rotational frame 31 at which the LM-guide 30 is installed.

Thus, the bearing 40 when mounted inside the fixing block 38 may rotate the rotational frame 31 about the shaft 35 along the length of the vehicle. Accordingly, the horizontal movement of the power net runner 10 according to the shaking of the vehicle in the T-direction would not be delivered to the vision machine 12 and the robot 11.

The floating mechanism 20 in the illustrative embodiment of the present invention can flexibly vibrations created by the shaking of the vehicle in the T and H directions by applying a shock-absorbing action between the power nut runner 10 and the vision machine 12, and between the power nut runner 10 and the robot 11, by vertically moving the vertical sliding block 28 coupled to the power nut runner 10 by the LM guide 30, and rotating the rotational frame 31 coupled to the power nut runner 10 by the shaft 35 and the bearing 40.

Also, the shaking of the vehicle in the T and H directions, absorbed through the floating mechanism 20, instead of being delivered to the vision machine 12 and the robot 11, thereby reducing shock to the vision machine 12 and the robot 11 after insertion of the machine nut runner 10, and thus extending the lifespan of the vision machine 12 and the robot 11.

Advantageously, an automated toe adjustment apparatus using a floating mechanism allows a vertical sliding block and a rotational frame to perform a shock-absorbing function between the power nut runner and a vision machine or a robot caused from shaking a vehicle in the T and H directions. Additionally, the shock created from shaking the vehicle in the T and H directions can be absorbed by the floating mechanism instead of being delivered to the vision machine and the robot. Thus, the lifespan of the vision machine and the robot can be extended because of the decrease in vibrations to their respective systems.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An automated toe adjustment apparatus, comprising:
a power nut runner adjusting a toe by adjusting an adjusting bolt of a tie-rod assembly;
a vision machine configured to photograph the power nut runner to verify position information of the power nut runner;
a robot engaging the power nut runner with the adjusting bolt of the tie-rod assembly and rotating the power nut runner; and
a floating mechanism absorbing a shock between the power nut runner and the robot, wherein the floating mechanism includes:
a vertical sliding block coupled to a rear surface of a body frame on which the power nut runner is mounted;
rotational frame on which a linear motion guide is mounted to be vertically movable along the linear motion guide; and
a rotational floating unit configured to rotate the power nut runner about a shaft by a bearing.

2. The automated toe adjustment apparatus of claim 1, wherein the floating mechanism further includes:

a plurality of vertical control plungers at an upper portion and a lower portion of a vertical sliding block to control a vertical movement of the vertical sliding block.

3. The automated toe adjustment apparatus of claim 1, wherein the rotational floating unit is connected to a middle portion of the power nut runner, and comprises:
a shaft rotating the power nut runner; and
a fixing block allowing the shaft to be rotatably mounted by a bearing at a central portion thereof, and allowing the vision machine and the robot to be coupled to a top surface and a rear surface thereof, respectively.

4. The automated toe adjustment apparatus of claim 1, wherein the rotational floating unit comprises:
a rotational block rotating at the same angle as the power nut runner; and
a rotation controlling plunger for controlling a rotation of the power nut runner by a contact and an interference with the rotational block.

5. An automated toe adjustment apparatus, comprising:
a power nut runner configured to adjust a toe by adjusting a bolt of a tie-rod assembly;
a vision machine configured to photograph the nut runner to verify position information of the power nut runner;
a robot configured to engage the power nut runner with the bolt of the tie-rod assembly and rotate the power nut runner; and
a floating mechanism configured to absorb a shock between the power nut runner and the robot, wherein the floating mechanism includes:
a vertical floating unit having a vertical sliding block coupled to a rear surface of a body frame onto which the power nut runner is mounted and a rotational frame on which a linear motion guide is mounted to be vertically movable along the linear motion guide;
a rotational floating unit rotating the power runner about a shaft by a bearing.

6. The automated toe adjustment apparatus of claim 5, wherein the vertical floating unit further comprises:
a plurality of vertical control plungers at an upper portion and a lower portion of a vertical sliding block to control a vertical movement of the vertical sliding block.

7. The automated toe adjustment apparatus of claim 5, wherein the rotational floating unit is connected to a first portion of the power nut runner, and comprises:
a shaft rotating the power nut runner; and
a fixing block allowing the shaft to be rotatably mounted by a bearing at a second portion thereof, and allowing the vision machine and the robot to be coupled to a top surface and a rear surface thereof, respectively.

8. The automated toe adjustment apparatus of claim 5, wherein the rotational floating unit comprises:
a rotational block rotating at the same angle as the power nut runner; and
a rotation controlling plunger for controlling a rotation of the power nut runner by a contact and an interference with the rotational block.

9. A method for automated toe adjustment, the method comprising:
adjusting, by an automated power nut runner, the toe adjusted by adjusting a bolt associated with a tie-rod assembly;
photographing the power nut runner utilizing a vision machine to verify position information of the power nut runner;
determining, by a computer, that the power nut runner is in the correct position based on the photographs taken by the vision machine;
in response to determining the power nut runner is in the correct position, engaging, by a robot, the power nut runner with the bolt of the tie-rod assembly and rotating the power nut runner; and
absorbing by a floating mechanism shock between the power nut runner and the robot wherein the floating mechanism preventing shock from being delivered to the robot and the power nut runner and includes:
a vertical sliding block coupled to a rear surface of a body frame on which the power nut runner is mounted; and
a rotational frame on which a linear motion guide is mounted to be vertically movable along the linear motion guide.

* * * * *